United States Patent
Takahashi et al.

(10) Patent No.: US 6,901,196 B2
(45) Date of Patent: May 31, 2005

(54) OPTICAL FIBER HAVING A LOWER BENDING LOSS

(75) Inventors: Fumio Takahashi, Chiyoda-ku (JP); Hideya Moridaira, Chiyoda-ku (JP); Taeko Shibuta, Chiyoda-ku (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/870,916

(22) Filed: Jun. 21, 2004

(65) Prior Publication Data

US 2004/0264896 A1 Dec. 30, 2004

(30) Foreign Application Priority Data

Jun. 26, 2003 (JP) ........................................ 2003-182517

(51) Int. Cl.[7] .................................................. G02B 6/18
(52) U.S. Cl. ...................... 385/124; 385/122; 385/123; 385/125; 385/126; 385/114
(58) Field of Search .......................... 385/100, 103–104, 385/106–107, 109–111, 114, 123–128, 141–145

(56) References Cited

U.S. PATENT DOCUMENTS

| | | | | |
|---|---|---|---|---|
| 4,691,990 A | * | 9/1987 | Cohen et al. | ................ 385/127 |
| 6,522,819 B2 | * | 2/2003 | Shimotakahara et al. | ... 385/123 |
| 6,754,421 B2 | * | 6/2004 | Shimotakahara et al. | ... 385/123 |
| 6,795,628 B2 | * | 9/2004 | Shibuta | ....................... 385/123 |

FOREIGN PATENT DOCUMENTS

EP 1202086 A1 * 5/2002 ............ G02B/6/16

OTHER PUBLICATIONS

R. McMahon, Nonzero–Dispersion–shifted fiber: The choice for DWDM, Jan. 2001, WDM Solutions.*
A. Rossaro, P. Regio, T. Tambosso, Non–zero dispersion fibres: markets and standards, EXP, vol. 2, Mar. 2002.*

* cited by examiner

Primary Examiner—Frank G. Font
Assistant Examiner—Ryan Lepisto
(74) Attorney, Agent, or Firm—Oblon, Spivak, McClelland, Maier & Neustadt, P.C.

(57) ABSTRACT

An optical fiber includes a first core having a relative refractive index difference of larger than 0.36%, and a cladding. The optical fiber has fiber cut-off wavelength λc of more than 1350 nm, cable cut-off wavelength λcc of less than 1285 nm, bending loss at a wavelength of 1625 nm of not more than 10 dB/km when wound at a diameter of 20 mm, transmission loss at a wavelength range of 1285 to 1625 nm of not more than 0.40 dB/km, transmission loss at a wavelength of 1383 nm less than transmission loss at a wavelength of 1310 nm, and difference in transmission loss at a wavelength of 1383 nm of not more than 0.04 dB/km before and after exposure to hydrogen. The lower bending loss of the optical fiber provides an optical fiber cable for use in a WDM transmission in wavelength range of 1285 to 1625 nm.

5 Claims, 7 Drawing Sheets

TABLE 1

| | Δ1 | "a" | λc | λcc | MFD | Aeff | DISPERSION | | λ0 | TRANSMISSION LOSS | | | BENDING LOSS |
|---|---|---|---|---|---|---|---|---|---|---|---|---|---|
| | | | | | | | | | | BEFORE EXPOSURE | | INCREASE OF LOSS OF EXPOSURE | 20mmφ |
| UNIT | % | μm | nm | nm | μm | μm2 | ps/km/nm | | nm | dB/km | | dB/km | dB/m |
| WAVELENGTH | | | | | @1310nm | @1550nm | @1285nm | @1550nm | | @1310nm | @1383nm | @1383nm | @1625nm |
| SAMPLE 1 | 0.39 | 8.4 | 1372 | 1270 | 8.8 | 76 | -1.9 | 17.0 | 1307 | 0.33 | 0.31 | 0.01 | 1.0 |
| SAMPLE 2 | 0.37 | 8.7 | 1380 | 1284 | 9.1 | 78 | -1.8 | 17.2 | 1305 | 0.32 | 0.30 | 0.02 | 1.2 |
| SAMPLE 3 | 0.42 | 8.1 | 1354 | 1255 | 8.5 | 72 | -2.2 | 16.7 | 1309 | 0.33 | 0.32 | 0.00 | 0.6 |
| COMPA EX. | 0.35 | 8.2 | 1270 | 1170 | 9.3 | 82 | -2.7 | 16.2 | 1315 | 0.32 | 0.30 | 0.01 | 15.0 |

OPTICAL FIBER HAVING A LOWER BENDING LOSS

BACKGROUND OF THE INVENTION (a) Field of the Invention

The present invention relates to an optical fiber having a lower bending loss suitable for wavelength division multiplexing (WDM) transmission. The present invention also relates to an optical fiber cable including such an optical fiber.

(b) Description of the Related Art

Along with the development of higher bit-rate and higher capacity optical transmission, the WDM transmission technique attracts larger attentions in the optical transmission field. In the current WDM transmission field, there are a request for further increasing the transmission capacity, and an attempt for enlarging the wavelength range for the optical transmission.

It is noted in the conventional optical fiber that the optical fiber is likely to include as mixed impurities the OH group having an absorption peak around a wavelength of 1383 nm. Thus, in general, the conventional optical fiber is not suitable for the WDM transmission around a wavelength of 1383 nm.

In order to solve the above problem, Patent Publication U.S. Pat. No. 6,205,268 discloses a specific optical fiber having a refractive index profile similar to that of a typical single mode optical fiber (referred to as SMF hereinafter) having a zero-dispersion wavelength in a wavelength band of 1.31 $\mu$m and yet having a reduced absorption loss caused by the OH group. The disclosed optical fiber is designed to have a wide wavelength range between 1285 nm and 1600 nm in the WDM transmission.

A typical optical fiber generally comprises a core region disposed at the central area of the fiber and a cladding surrounding the outer periphery of the core, and at least two coating layers surrounding the outer periphery of the cladding. The coating layers have different Young's moduli and are made of ultraviolet-cured resin or thermo-cured resin.

Figure 8:
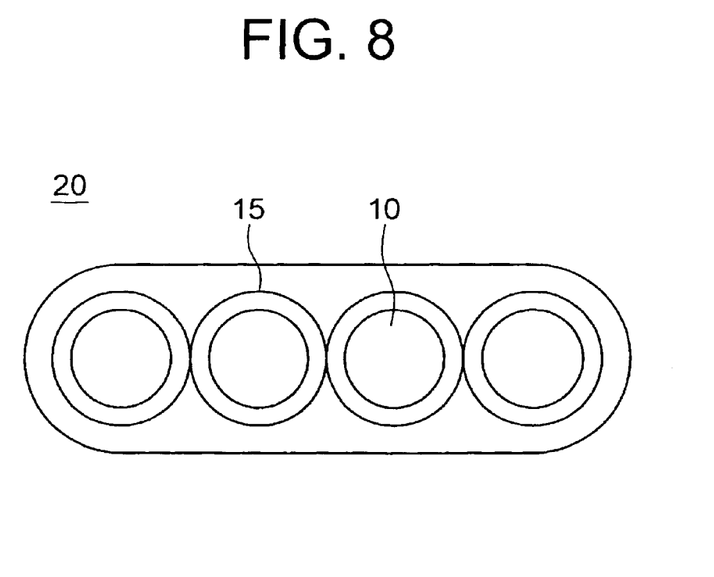
FIG. 8 is a cross-sectional view of a typical optical fiber ribbon.

FIG. 8 shows an optical fiber ribbon, generally designated by numeral 20, including a plurality of optical fibers 10. The optical fibers 10 each coated with a colored layer 15 on the outer periphery thereof are arranged in a plane to form a parallel array. The optical fibers 10 are covered with ultraviolet-cured resin all together.

An optical fiber cable is widely used which includes therein a plurality of such optical fiber ribbons each having, for example, four, eight, twelve, or twenty-four optical fibers.

Figure 9:
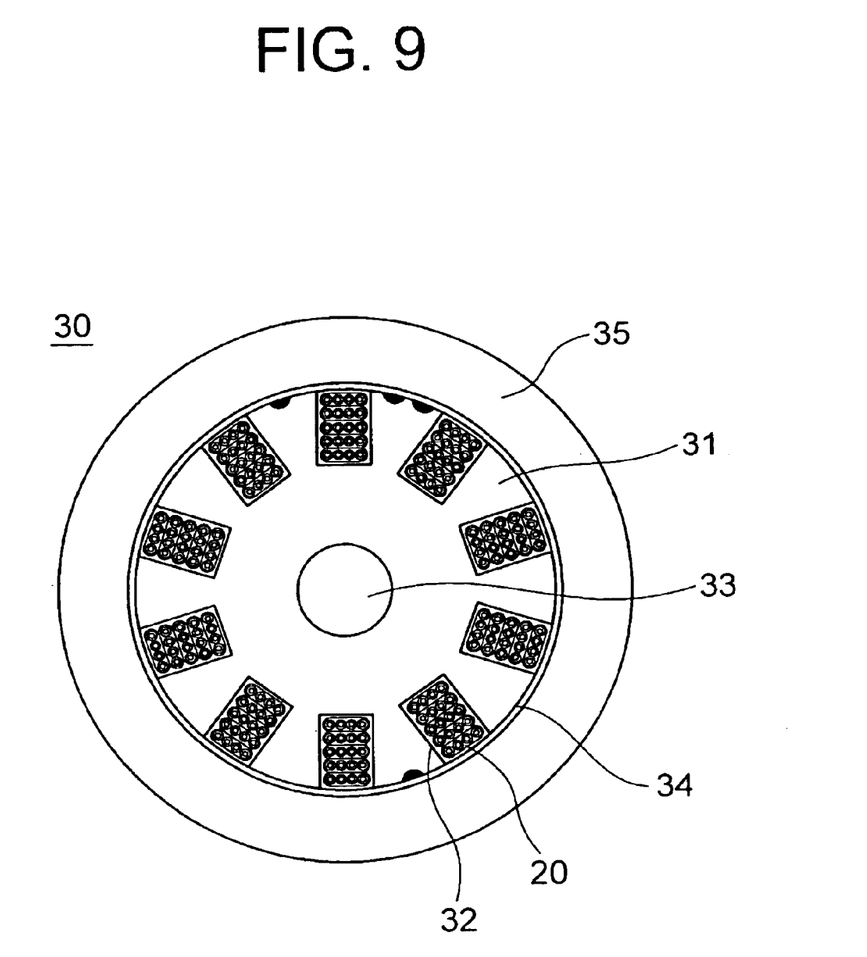
FIG. 9 is a cross-sectional view of a typical slotted core type optical fiber ribbon cable.

The optical fiber cable used in a metropolitan area has a larger number of optical fibers as much as about 1000. FIG. 9 shows a cross sectional view of a slotted core type optical fiber ribbon cable.

The slotted core type optical fiber ribbon cable 30 shown in FIG. 9 has a slot rod 31 having in the exterior surface thereof a plurality of slots 32 each having a helical pitch. Each slot 32 accommodates therein a plurality of optical fiber ribbons 20 stacked as shown in FIG. 8. Each optical fiber ribbon 20 may include four, eight or more optical fibers.

The slot rod 31 is an elongated plastic member made of polyethylene, and includes at the center thereof a strength member 33 such as a metallic wire or a fiber-reinforced plastic (FRP) rod. The outer periphery of the slot rod 31 is wrapped with a tape 34, and then covered with a plastic sheath 35 such as polyethylene or polyvinyl chloride.

The slotted core type optical fiber ribbon cable 30 as described above has the advantage of higher-density integration of optical fibers and higher reliability in the mechanical characteristics thereof.

The slotted core type optical fiber ribbon cable 30 is generally free from disarrangement of the optical fiber ribbons due to the structure thereof. However, when bending is excessively applied to the optical fiber cable, the ends of the stacked optical fiber ribbons 20 may be pushed against the inner wall of the slot 32 and the transmission loss of the optical fibers in the optical fiber ribbons may increase, due to a lateral force therefrom.

Especially, four fibers at the corners of the stacked optical fiber ribbons tend to show higher increase of the transmission loss.

The specific optical fiber described in the patent publication U.S. Pat. No. 6,205,268 has a refractive index profile similar to that of the SMF and has a reduced absorption loss around 1383 nm caused by the OH group, but generally has a higher bending loss compared to a dispersion shifted fiber (DSF) having a higher refractive index at the core region thereof.

Therefore, after accommodated into the slotted core type optical fiber ribbon cable, the specific optical fiber shows higher increase of the transmission loss, due to the lateral force. The higher increase of the transmission loss is remarkable especially in the L-band, wavelength band between 1565 nm and 1625 nm, and may exceed 1 dB/km, which was a problem for applying the slotted core type optical fiber ribbon cable using the specific optical fiber to a wide wavelength range of WDM optical transmission.

SUMMARY OF THE INVENTION

In order to overcome the above problem, it is an object of the present invention to provide an optical fiber having a lower bending loss and applicable for a slotted core optical fiber ribbon cable capable of WDM optical transmission in the wide wavelength range of 1285 nm to 1625 nm, by suppressing the transmission loss increase in the L-band due to lateral force.

It is another object of the present invention to provide a slotted core type optical fiber ribbon cable including a plurality of such optical fibers.

The present invention provides an optical fiber including a core region disposed at a center of the optical fiber and a cladding surrounding around an outer periphery of the core region, the core region having a maximum relative refractive index difference of larger than 0.36% and a minimum relative refractive index difference of larger than −0.05% with respect to the cladding, the optical fiber having: a mode field diameter of 8 to 10 $\mu$m at a wavelength of 1310 nm; an effective area of 70 to 90 $\mu$m$^2$ at a wavelength of 1550 nm; a zero-dispersion wavelength in the wavelength range of 1285 to 1330 nm; a fiber cut-off wavelength ($\lambda$c) by a 2-meter measurement of more than 1350 nm; a cable cut-off wavelength ($\lambda$cc) by a 22-meter measurement of less than 1285 nm; a chromatic dispersion at a wavelength of 1550 nm of not more than 20 ps/nm/km; a bending loss at a wavelength of 1625 nm of not more than 10 dB/m when wound at a radius of 10 mm; a transmission loss in a wavelength range of 1285 to 1625 nm of not more than 0.40 dB/km; a transmission loss at a wavelength of 1383 nm less than a transmission loss at a wavelength of 1310 nm; and a difference in the transmission loss at a wavelength of 1383 nm of not more than 0.04 dB/km between before and after exposure to hydrogen.

The present invention also provides a slotted core type optical fiber ribbon cable including a plurality of optical fibers as described above.

In this specification, the terms are based on the definitions according to ITU-T G.650.1, unless otherwise specified.

The above and other objects, features and advantages of the present invention will be more apparent from the following description, referring to the accompanying drawings.

PREFERRED EMBODIMENT OF THE INVENTION

Now, the present invention is more specifically described with reference to accompanying drawings, wherein similar constituent elements are designated by similar reference numerals throughout the drawings.

Figure 1A:
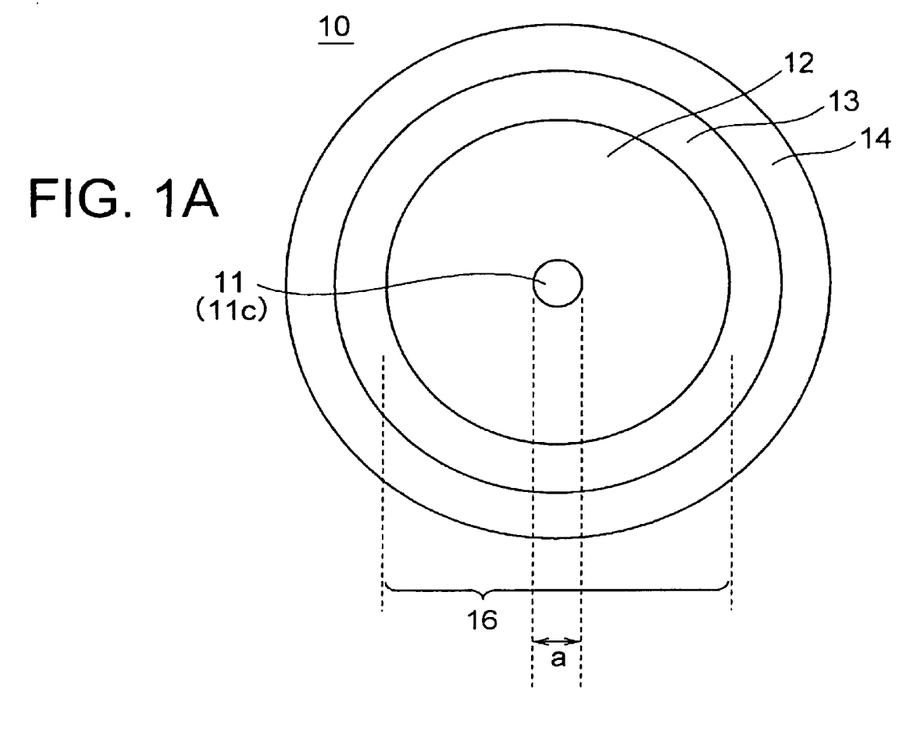
FIG. 1A is a cross-sectional view of an optical fiber according to an embodiment of the present invention.

Referring to FIG. 1A, an optical fiber, generally designated by numeral 10, according to an embodiment of the present invention includes a glass optical fiber 16 disposed at the center of the optical fiber 10, and two coating layers surrounding the outer periphery of the glass optical fiber 16 and including a primary coating layer 13 and a secondary coating layer 14. The coating layers 13 and 14 are made of ultraviolet-cured resin, for example. The construction of the optical fiber 10 is similar to that of the conventional optical fiber. The glass optical fiber 16 includes a core region (core) 11 disposed at the center of the optical fiber 10, and a cladding 12 surrounding the outer periphery of the core region 11.

Figure 1B:
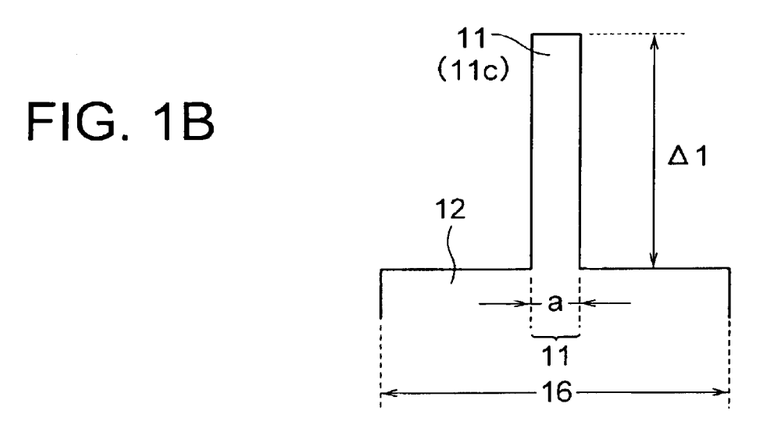
FIG. 1B is a graph exemplifying a refractive index profile of the glass optical fiber in the optical fiber of FIG. 1A.

Referring to FIG. 1B, the core region 11 in the present embodiment includes a first core 11c, which has a refractive index higher than the refractive index of the cladding 12 in the glass optical fiber 16. The first core 11c has a maximum relative refractive index difference Δ1 with respect to the cladding 12. The relative refractive index difference Δ1 is defined by the following formula:

$$\Delta1=\{(n11-n12)/n11\}\times100(\%) \quad (1)$$

wherein n11 is the maximum refractive index of the first core 11c and n12 is the refractive index of the cladding 12. The first core 11c has a diameter of "a", and the maximum relative refractive index difference Δ1 of the first core 11c is 0.36% or higher in the present embodiment.

Figure 2A:
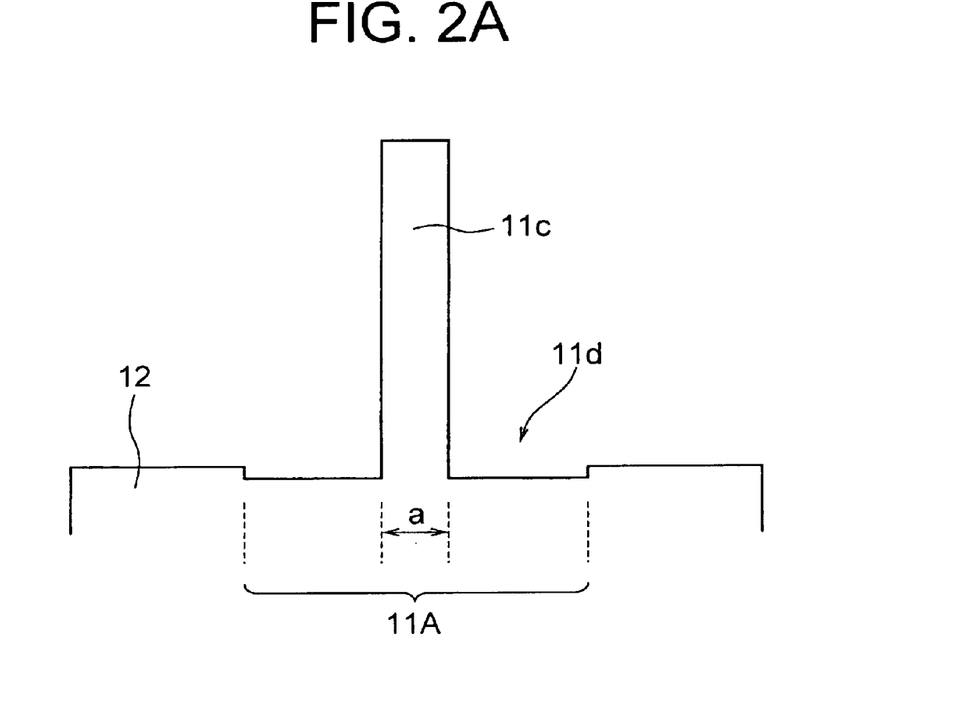
FIGS. 2A and 2B show other examples of the refractive index profiles in the optical fiber of FIG. 1A.
Figure 2B:
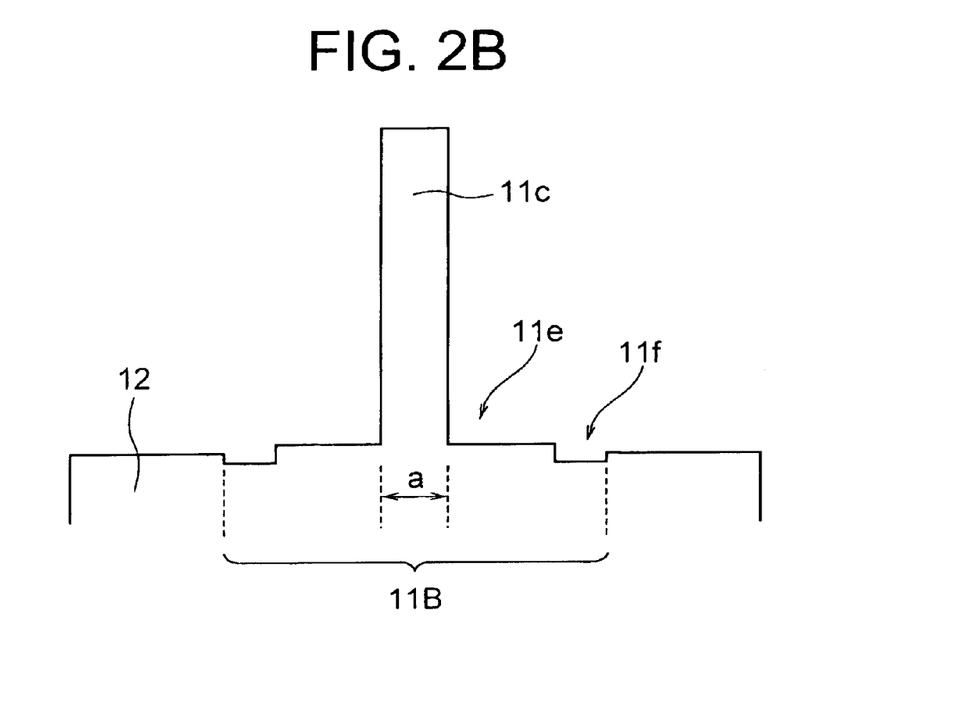

Referring to FIGS. 2A and 2B, there are shown other examples of the refractive index profiles of optical fibers modified from the optical fiber shown in FIG. 1A. In the example of FIG. 2A, the core region 11A includes a first core 11c disposed at the center of the glass optical fiber 16A, and a second core 11d surrounding the outer periphery of the first core 11c. In the example of FIG. 2B, the core region 11A has first through third cores 11c, 11e and 11f consecutively arranged as viewed from the center of the glass optical fiber 16B. Here, as shown in FIGS. 2A and 2B, the core region 11 indicates a region in which reflective index is different from the cladding 12.

The core region 11A shown in FIG. 2A as well as the core region 11B shown in FIG. 2B has a minimum relative refractive index difference of larger than −0.05%.

The first core 11c has a diameter of "a", wherein the diameter "a" indicates the diameter at a position which a relative refractive index difference with respect to the cladding is half the Δ1. The second core 11d in FIG. 2A has a minimum relative refractive index difference of not less than −0.05%. The second and third cores 11e and 11f in FIG. 2B have minimum refractive index differences of not less than −0.05%, respectively. In the present invention, the core region has a maximum relative refractive index difference of larger than 0.36% and a minimum relative refractive index difference of larger than −0.05% with respect to the cladding; it is not limited to above embodiments. The diameter "a" is referred to as first core diameter hereinafter in this text.

The glass optical fiber 16 is obtained by doping germanium (Ge) into the core region to increase the refractive index. The core region may be additionally doped with fluorine (F) for the purpose of improving the transmission loss etc., into at least a portion of the core 11, 11A or 11B.

The outer diameter of the glass optical fiber 16 is typically 125 μm. Both the primary coating layer 13 and the secondary coating layer 14 may be made of ultraviolet-cured, polyether-based urethane acrylate resin, wherein the inner coating layer 13 has a lower Young's modulus compared to the outer coating layer 14.

For example, the primary coating layer 13 has an outer diameter of 190 μm or less, and a Young's modulus of not more than 0.5 kg/mm² at the room temperature. The secondary coating layer 14 has an outer diameter of 240 μm or more, and a Young's modulus of not less than 50 kg/mm² at the room temperature.

Figure 3:
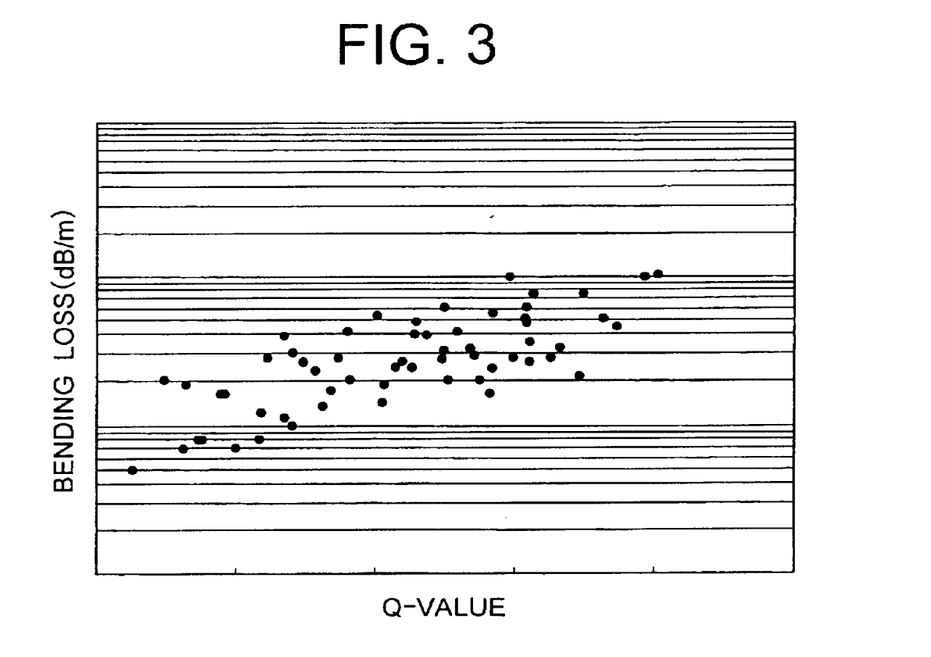
FIG. 3 is a graph showing the relationship between the Q-value of a general optical fiber and the bending loss thereof.

It is known that the bending loss of the optical fiber has a correlation with the mode field diameter (MFD) and the fiber cut-off wavelength λc of the optical fiber by a 2-meter measurement. More particularly, Q-value, defined as the ratio of the MFD to the fiber cut-off wavelength λc, has higher correlation with the bending loss, and a lower Q-value provides a lower bending loss. This is exemplified in FIG. 3. Thus, the way to reduce the bending loss is considered to make MFD smaller and/or fiber cut-off wavelength λc longer.

However, smaller MFD may cause a non-linear phenomenon such as self-phase modulation (SPM) or cross-phase modulation (XPM) in the optical transmission. Therefore, it is preferable to make fiber cut-off wavelength λc longer to improve the bending loss while suppressing the non-linear phenomenon such as the SPM or XPM.

Figure 4:
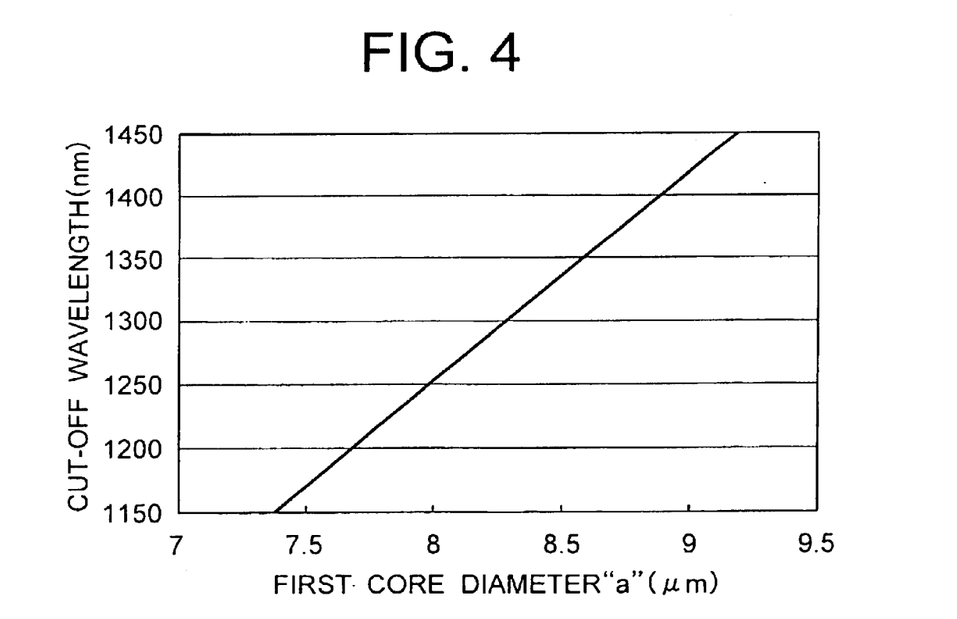
FIG. 4 is a graph showing the relationship between the first core diameter and the cut-off wavelength in an optical fiber having a step-index profile.

FIG. 4 shows the relationship between the first core diameter "a" and the fiber cut-off wavelength λc of the step-index type optical fiber shown in FIG. 1. As understood from FIG. 4, the first core diameter "a" is in proportion to the fiber cut-off wavelength λc, wherein a larger first core diameter "a" provides a longer cut-off wavelength λc. It is easy to make the cut-off wavelength λc longer in the production view, including production efficiency, of the optical fiber.

Furthermore, considering the WDM transmission in the wavelength range of 1285 to 1625 nm, single-mode operation should be assured, by maintaining the cable cut-off wavelength λcc at 1285 nm or less.

As described above, it is effective to make fiber cut-off wavelength λc longer for improving the bending loss while suppressing the non-linear phenomenon and also easy to realize in the production view. To obtain a cable cut-off wavelength λcc of 1285 nm or less, the fiber cut-off wavelength λc by a 2-meter measurement may exceed 1350 nm.

Thus, the optical fiber of the present embodiment assures a single-mode operation at a wavelength of not lower than 1285 nm and achieves an improved bending loss, by setting the cable cut-off wavelength λcc by a 22-meter measurement of not more than 1285 nm and the fiber cut-off wavelength λc by a 2-meter measurement of more than 1350 nm. Since the optical fiber of the present embodiment can be obtained only by adjusting the first core diameter "a", the optical fiber can be manufactured at a production cost similar to that of the conventional optical fiber.

EXAMPLES

Examples of the present embodiment will be described hereinafter.

For fabricating the glass optical fiber 16 having the refractive index profile shown in the graph of FIG. 1B, an optical fiber preform was first manufactured. In the manufacturing of the optical fiber preform, a porous core soot including the first core and a part of the cladding was formed by using a vapour-phase axial deposition (VAD) method. The resultant porous preform was dehydrated and vitrified to obtain a core glass rod.

It should be noted here that, in order for suitable WDM transmission in a wavelength range of 1285 to 1625 nm, the absorption loss by the OH radical at a wavelength of 1383 nm should be reduced as much as possible, and the increase of the absorption loss even after exposure to hydrogen should be suppressed as much as possible. Therefore, it is required for the OH radicals not to mix into the optical fiber during a manufacturing process.

In view of the above, a technique is generally used wherein the first core 11c and a cladding region having a diameter of not less than 4 times the first core diameter "a" are manufactured by a single process to form a porous core soot for the prevention of mixing of the OH radicals. This method provides no production interface in the vicinity of the MFD of the optical fiber, thereby suppressing the mixing of the OH radicals into the MFD region and reducing the transmission loss at a wavelength of 1383 nm. In addition, the resultant optical fiber has very few structural defects within the MFD, whereby the increase of the transmission loss at a wavelength of 1383 nm after the exposure of the optical fiber to hydrogen is suppressed.

Then, the remaining part of the cladding was manufactured around the outer periphery of the core glass rod, as described above, by using an outside vapour deposition (OVD) method or rod-in-tube method to thereby obtain an optical fiber preform.

Figure 5:
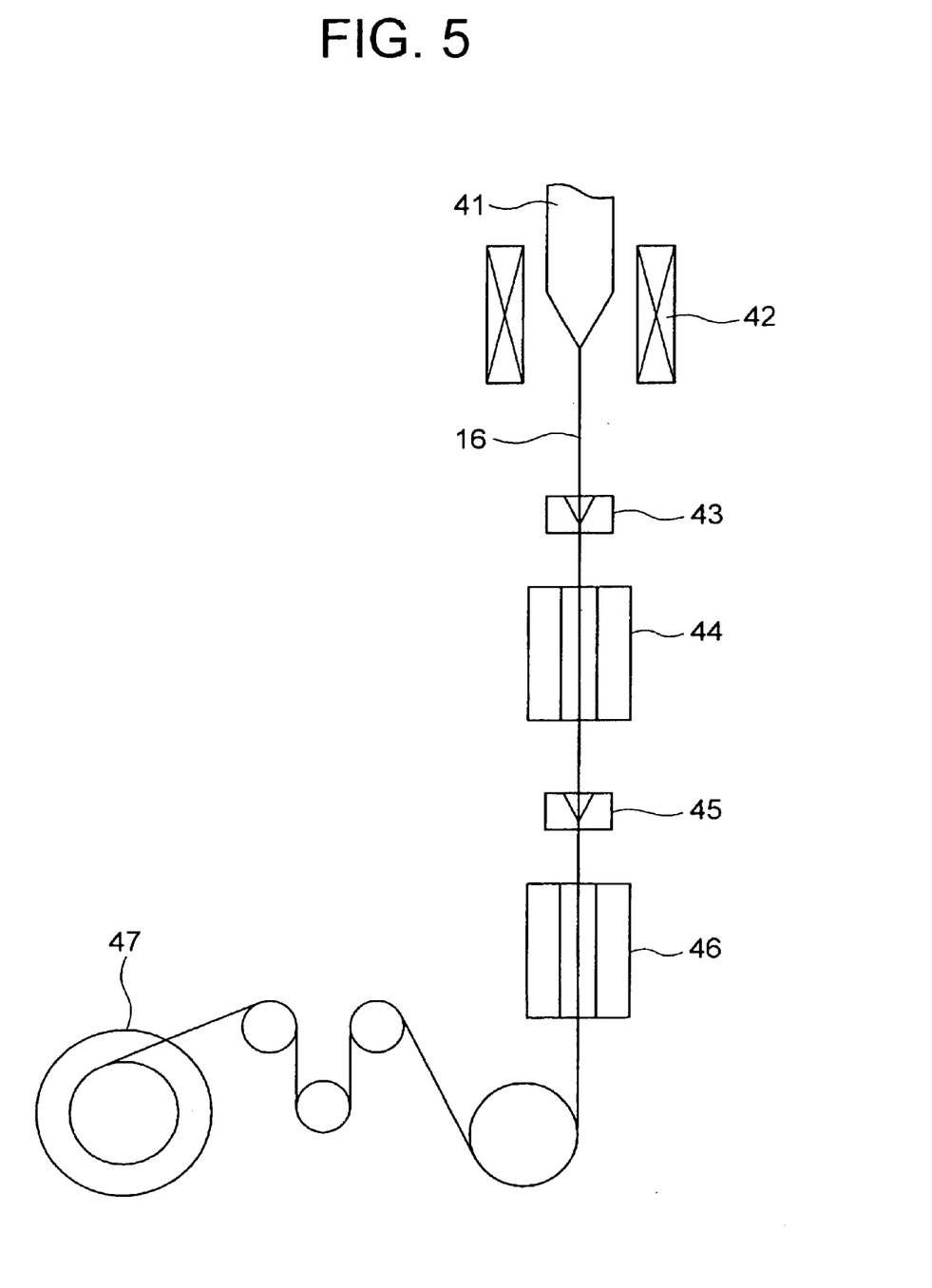
FIG. 5 is a schematic sectional view showing a typical process for manufacturing an optical fiber.

The resultant optical fiber preform was then drawn in the drawing process as schematically shown in FIG. 5 to obtain the optical fiber 10. More specifically, the optical fiber preform 41 was thermally melted in a drawing furnace 42 and drawn to obtain a glass optical fiber 16 having an outer diameter of 125 μm. The glass optical fiber 16 was coated with an ultraviolet-curable resin for primary coating by using a coating die 43 and cured by an ultraviolet ray irradiating lamp 44, and then subsequently coated with an ultraviolet-curable resin for secondary coating by using a coating die 45 and cured by an ultraviolet ray irradiating lamp 46, to form an optical fiber 10. The optical fiber was wound around a bobbin 47.

Young's moduli of the primary coating layer 13 and the secondary coating layer 14 were 0.1 kg/mm$^2$ and 100 kg/mm$^2$ at room temperature, respectively. The outer diameters of the primary coating layer 13 and the secondary coating layer 14 were about 185 μm and about 250 μm, respectively. Each Young's modulus was calculated from the tensile strength at 2.5% elongation of a sheet of 0.2 mm thickness. The sheet of 0.2 mm thickness was made by curing the ultraviolet-curable resin by irradiating the ultraviolet ray in the atmospheric ambient at an intensity of 200 mW/cm$^2$ in an amount of 1000 mJ/cm$^2$. The sheet was then subjected to a tensile test at a temperature of 23 degrees C and at a tensile speed of 1 mm/min.

The optical fiber was exposed to a deuterium containing atmosphere for 24 hours at room temperature and at 1(one) atmospheric pressure. The exposure of the optical fiber to the deuterium containing atmosphere can fill the few defects remaining in the optical fiber with deuterium, if any, whereby an optical fiber exhibiting a substantially no increase in the transmission loss at a wavelength of 1383 nm after exposure thereof to hydrogen can be obtained.

Figure 6:
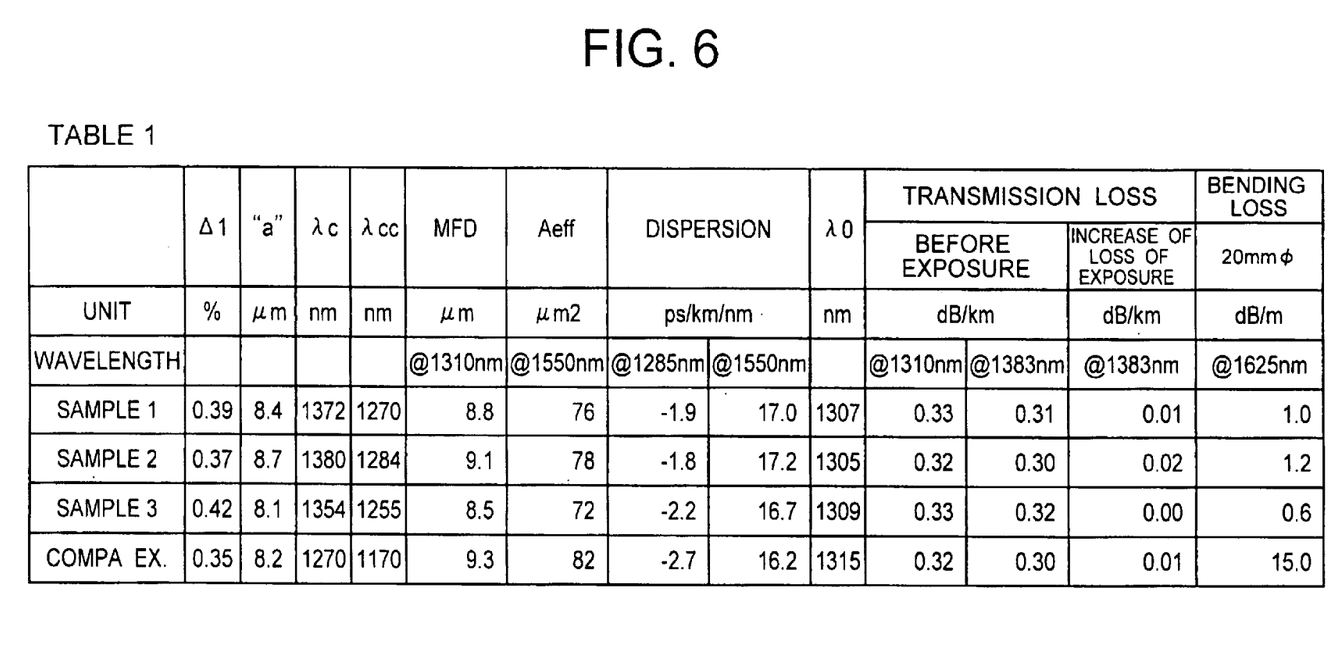
FIG. 6 is a table showing the fiber characteristics of samples of the optical fiber.

FIG. 6 (Table 1) shows the fiber characteristics of samples of the resultant optical fiber, indicating together the relative refractive index difference 1, first core diameter "a", fiber cut-off wavelength λc by a 2-meter measurement, cable cut-off wavelength λcc by a 22-meter measurement, MFD at a wavelength of 1310 nm, effective area Aeff at a wavelength of 1550 nm, chromatic dispersion at wavelengths of 1285 nm and 1550 nm, zero-dispersion wavelength λ0, transmission loss at wavelengths of 1310 nm and 1383 nm before exposure to hydrogen, and bending loss at a wavelength of 1625 nm when the optical fiber was wound at a diameter of 20 mm.

For comparison, average fiber characteristics of the conventional SMF are also shown in the table as a comparative example. The definitions of these fiber characteristics are based on the standard G.650.1 of ITU-T unless otherwise specified.

As shown in Table 1, the samples-1 to -3 of the present embodiment exhibited MFDs of 8 to 10 μm at a wavelength of 1310 nm, effective area Aeff at a wavelength of 1550 nm of 70 to 90 μm$^2$, zero-dispersion wavelengths in a wavelength range of 1285 to 1330 nm, fiber cut-off wavelengths λc by a 2-meter measurement of more than 1350 nm, cable cut-off wavelengths by a 22-meter measurement of less than 1285 nm, and chromatic dispersions at a wavelength of 1550 nm of not more than 20 ps/nm/km.

Those samples of the present embodiment also exhibited bending losses at a wavelength of 1625 nm of not more than 10 dB/m when wound at a radius of 10 mm, and a transmission loss at a wavelength of 1383 nm less than a transmission loss at a wavelength of 1310 nm.

The samples of the optical fiber were subjected to a hydrogen ageing test, wherein the conditions of the hydrogen ageing test was in compliance with IEC60793-2-50 2002-01 Annex.C.3.1. More specifically, the conditions for the hydrogen ageing test were such that the optical fiber under test was exposed to an 1% hydrogen containing environment at room temperature, until the transmission loss at a wavelength of 1240 nm increased by more than 0.03 dB/km from the transmission loss before the exposure to hydrogen, and that the transmission loss of the optical fiber was measured after 14 days or more since the optical fiber was left to the atmospheric environment. The measurement wavelength was set in a wavelength range of 1200 to 1650 nm.

Figure 7:
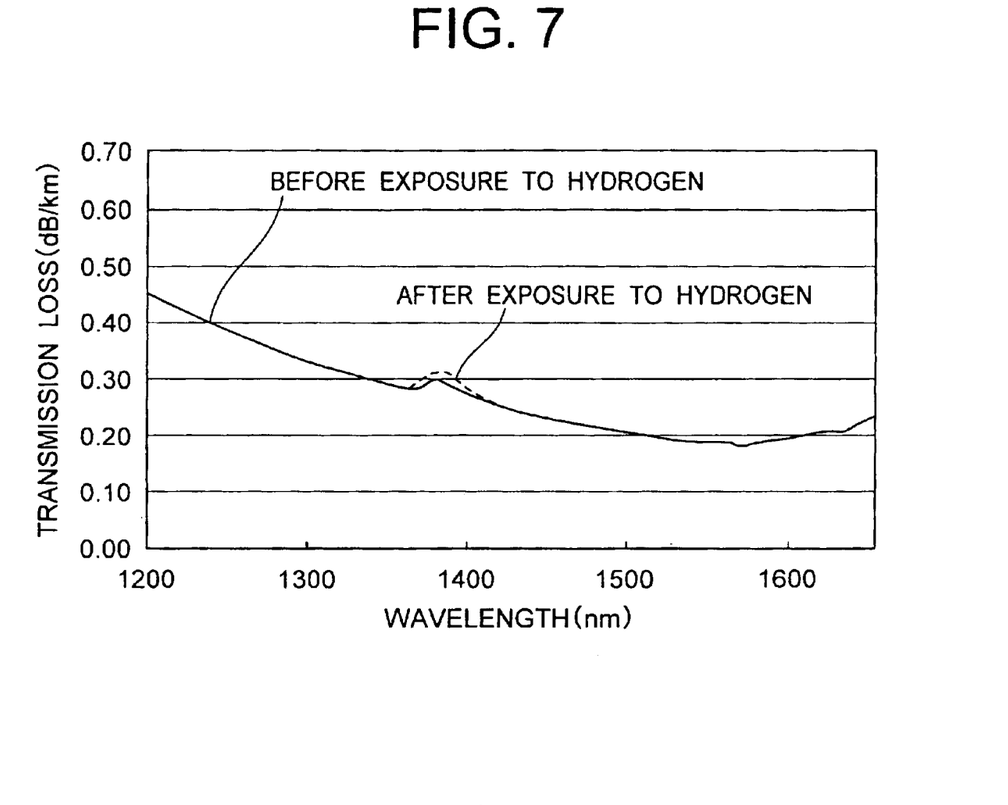
FIG. 7 is a graph showing the difference in the transmission loss/wavelength characteristic of the optical fiber according to the embodiment between before and after exposure to hydrogen.

FIG. 7 shows the transmission loss vs wavelength characteristics of one of the samples of the optical fiber before and after exposure to hydrogen, wherein the solid line represents the characteristic before the hydrogen ageing test and the dotted line represents the characteristic after the hydrogen ageing test. As understood from FIG. 7, the sample showed substantially no absorption loss by OH radicals at a wavelength of 1383 nm before the hydrogen ageing test, thereby achieving a transmission loss of not more than 0.40 dB/km in a wavelength range of 1285 to 1625 nm.

The sample also showed an extremely small increase in the transmission loss at a wavelength of 1383 nm after the hydrogen ageing test. The increase due to the exposure to hydrogen was not more than 0.04 dB/km in all the samples.

The samples of the optical fiber of the present embodiment having the above characteristics have a suppressed absorption loss caused by OH radicals, and an improved bending loss, whereby the samples can be suitably used in a WDM transmission in a relatively wide wavelength range of 1285 to 1625 nm.

Then, as shown in FIG. 8, each sample of the optical fibers 10 was coated with a coloring layer 15 to obtain a colored optical fiber. A plurality of (four in this example) colored optical fibers were arranged in a plane to form a parallel array, and then coated as a whole with ultraviolet-cured resin to form an optical fiber ribbon 20 shown in FIG. 8. Size of the optical fiber ribbon 20 thus obtained was 0.3-mm thickness and 1.1-mm width.

A plurality of optical fiber ribbons 20 thus manufactured were then stacked and accommodated into the slots 32, which were helically arranged at the outer periphery of a slot rod 31, having a central strength member 33 at the center thereof. The ratio of the cross-sectional area of the optical fiber ribbons 20 to the cross-sectional area of the helical slot 32 was not more than 50% in this example. The slot rod 31 including a plurality of helical slots 32 was consecutively wrapped with a tape 34 and covered with a sheath 35 thereon, to thereby obtain a slotted core type optical fiber ribbon cable 30. The slots 32 may be arranged at a periodical reversing helical pitch instead.

The change in the transmission loss of the optical fibers after manufacturing the cable was measured at a wavelength of 1625 nm, and a maximum value of the increase in the transmission loss within each slot was shown in Table 2.

TABLE 2

| Slot No. | Increase in transmission loss(dB/km) at a wavelength of 1625 nm |
|---|---|
| Slot 1 | 0.02 |
| Slot 2 | 0.03 |
| Slot 3 | 0.00 |
| Slot 4 | 0.01 |
| Slot 5 (Conventional) | 0.75 |
| Slot 6 (Conventional) | 0.52 |

As understood from Table 2, although the conventional optical fiber showed an increase of more than 0.5 dB/km at a wavelength of 1625 nm in the transmission loss after manufacturing the cable, the optical fibers of the present embodiment showed suppression of the increase in the transmission loss after manufacturing to the cable.

As described heretofore, the optical fiber of the present invention improves the transmission loss while suppressing the absorption loss caused by the OH radical of the optical fiber.

Accordingly, the optical fiber of the present invention can be used in the L-band, wavelength range of 1565 to 1625 nm, different from the conventional optical fiber having a larger increase in the transmission loss upon application of a lateral force. The optical fiber can be used in the WDM transmission in a relatively wide wavelength range of 1285 to 1625 nm.

The slotted core type optical fiber ribbon cable including the optical fibers of the present invention can be used for WDM transmission in the relatively wide wavelength range of 1285 to 1625 nm.

The optical fiber of the present invention can be obtained by a simple measure for making a fiber cut-off wavelength λc longer, and can be manufactured at a cost similar to the cost of the conventional optical fiber, thereby providing a higher industrial value.

Since the above embodiments are described only for examples, the present invention is not limited to the above embodiments and various modifications or alterations can be easily made therefrom by those skilled in the art without departing from the scope of the present invention.

What is claimed is:

1. An optical fiber comprising a core region disposed at a center of said optical fiber and a cladding surrounding around an outer periphery of said core region, said core region, having a maximum relative refractive index difference of larger than 0.36% and a minimum relative refractive index difference of larger than −0.05% with respect to said cladding, said optical fiber having:

a mode field diameter of 8 to 10 $\mu$m at a wavelength of 1310 nm;

an effective area of 70 to 90 $\mu m^2$ at a wavelength of 1550 nm;

a zero-dispersion wavelength in the wavelength range of 1285 to 1330 nm;

a fiber cut-off wavelength (λc) by a 2-meter measurement of more than 1350 nm;

a cable cut-off wavelength (λcc) by a 22-meter measurement of less than 1285 nm;

a chromatic dispersion at a wavelength of 1550 nm of not more than 20 ps/nm/km;

a bending loss at a wavelength of 1625 nm of not more than 10 dB/m when wound at a radius of 10 mm;

a transmission loss in a wavelength range of 1285 to 1625 nm of not more than 0.40 dB/km;

a transmission loss at a wavelength of 1383 nm less than a transmission loss at a wavelength of 1310 nm; and a difference in the transmission loss at a wavelength of 1383 nm of not more than 0.04 dB/km between before and after exposure to hydrogen.

2. An optical fiber ribbon comprising a plurality of optical fibers arranged in a parallel array, wherein each of said optical fibers has a core region disposed at a center of said optical fiber and a cladding surrounding around an outer periphery of said core region, said core region having a maximum relative refractive index difference of larger than 0.36% and a minimum relative refractive index difference of larger than −0.05% with respect to said cladding, said optical fiber having:

a mode field diameter of 8 to 10 μm at a wavelength of 1310 nm;

an effective area of 70 to 90 μm$^2$ at a wavelength of 1550 nm;

a zero-dispersion wavelength in the wavelength range of 1285 to 1330 nm;

a fiber cut-off wavelength (λc) by a 2-meter measurement of more than 1350 nm;

a cable cut-off wavelength (λcc) by a 22-meter measurement of less than 1285 nm;

a chromatic dispersion at a wavelength of 1550 nm of not more than 20 ps/nm/km;

a bending loss at a wavelength of 1625 nm of not more than 10 dB/m when wound at a radius of 10 mm;

a transmission loss in a wavelength range of 1285 to 1625 nm of not more than 0.40 dB/km;

a transmission loss at a wavelength of 1383 nm less than a transmission loss at a wavelength of 1310 nm; and a difference in the transmission loss at a wavelength of 1383 nm of not more than 0.04 dB/km between before and after exposure to hydrogen.

3. An optical fiber cable comprising:

a cylindrical rod including at least one slot accommodating therein a plurality of optical fiber ribbons; and a sheath covering said cylindrical rod, wherein each of said optical fiber ribbons has a plurality of optical fibers arranged in a parallel array, and each of said optical fibers has a core region disposed at a center of said optical fiber and a cladding surrounding around an outer periphery of said core region, said core region having a maximum relative refractive index difference of larger than 0.36% and a minimum relative refractive index difference of larger than −0.05% with respect to said cladding, said optical fiber having:

a mode field diameter of 8 to 10 μm at a wavelength of 1310 nm;

an effective area of 70 to 90 μm$^2$ at a wavelength of 1550 nm;

a zero-dispersion wavelength in the wavelength range of 1285 to 1330 nm;

a fiber cut-off wavelength (λc) by a 2-meter measurement of more than 1350 nm;

a cable cut-off wavelength (λcc) by a 22-meter measurement of less than 1285 nm;

a chromatic dispersion at a wavelength of 1550 nm of not more than 20 ps/nm/km;

a bending loss at a wavelength of 1625 nm of not more than 10 dB/m when wound at a radius of 10 mm;

a transmission loss in a wavelength range of 1285 to 1625 nm of not more than 0.40 dB/km;

a transmission loss at a wavelength of 1383 nm less than a transmission loss at a wavelength of 1310 nm; and a difference in the transmission loss at a wavelength of 1383 nm of not more than 0.04 dB/km between before and after exposure to hydrogen.

4. The optical fiber cable according to claim 3, wherein said slot has a helical pitch.

5. The optical fiber cable according to claim 3, wherein said slot has a periodical reversing helical pitch.

* * * * *